J. K. KOONS.
TRANSMISSION GEARING.
APPLICATION FILED JAN. 9, 1909.

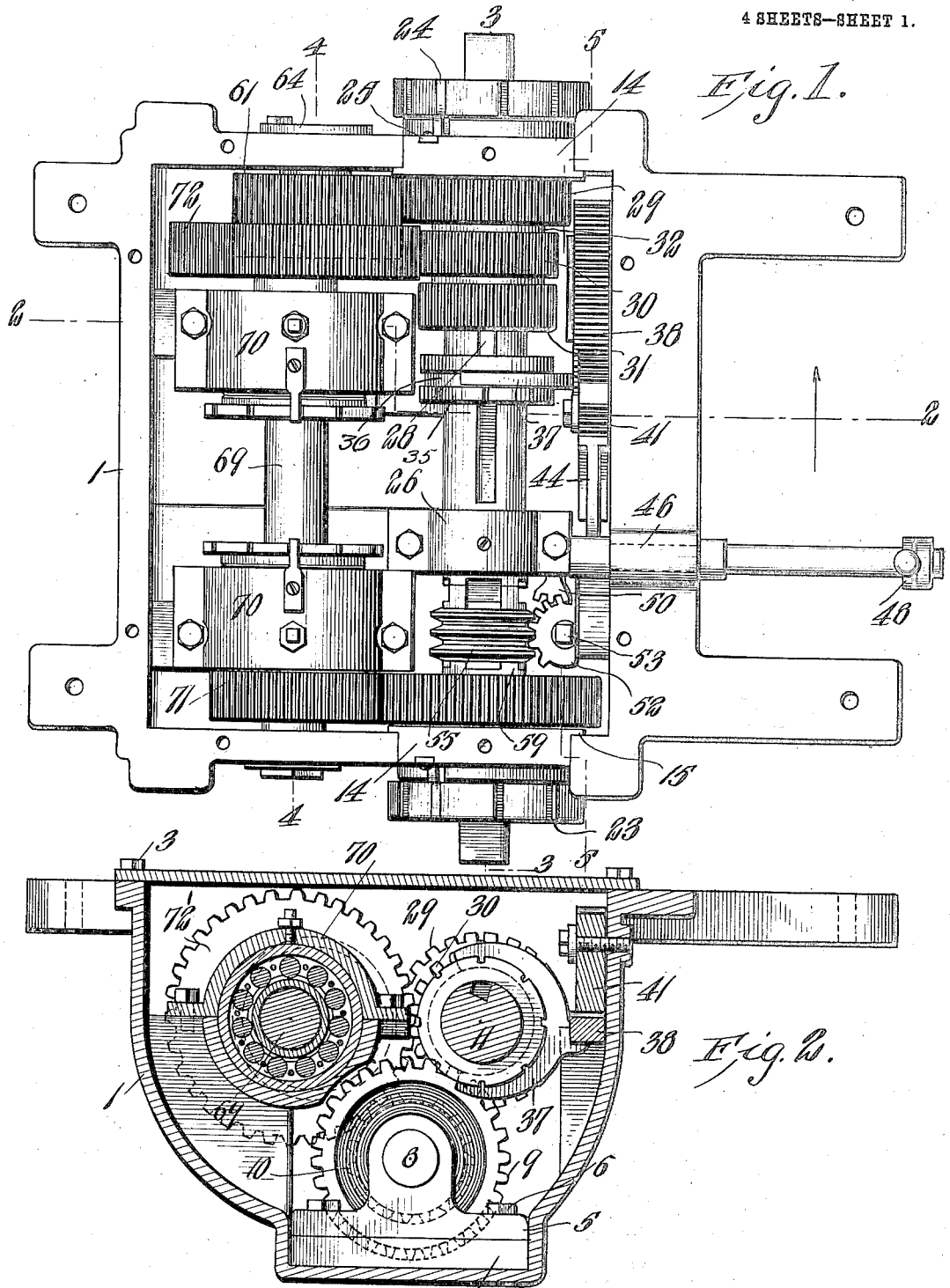

958,256.

Patented May 17, 1910.
4 SHEETS—SHEET 2.

WITNESSES
E. M. Callaghan
C. E. Trainor

INVENTOR
Joseph K. Koons
BY Munn & Co.
ATTORNEYS

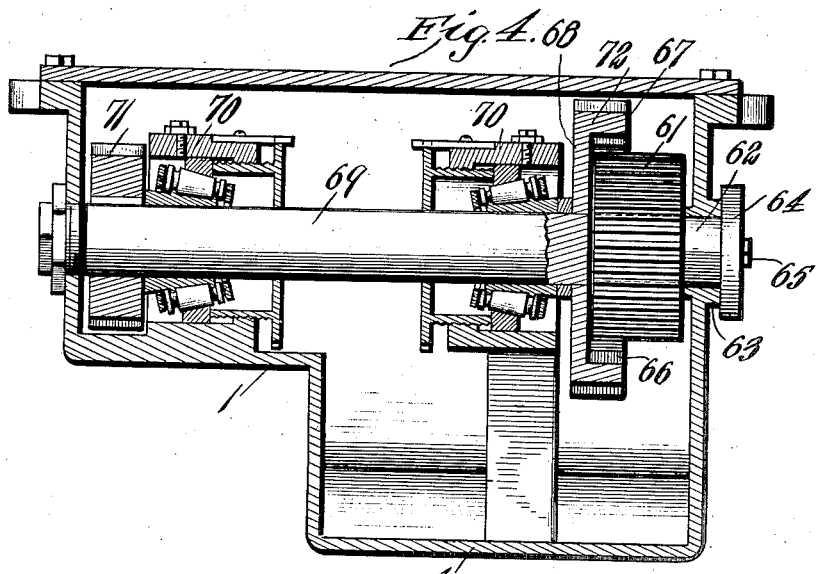
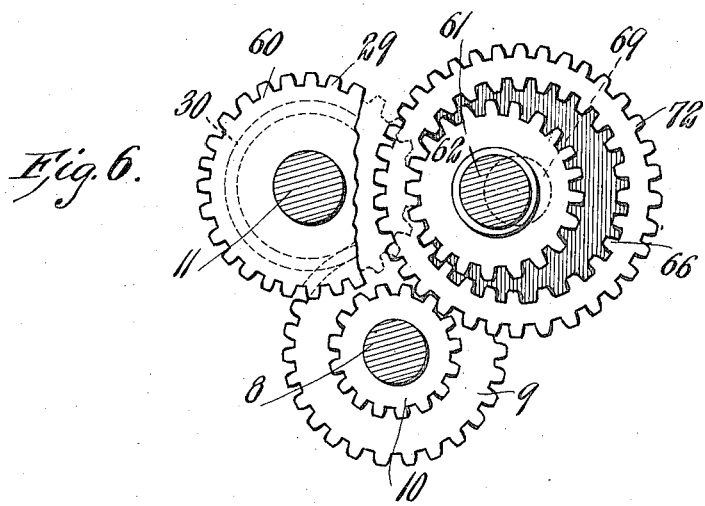

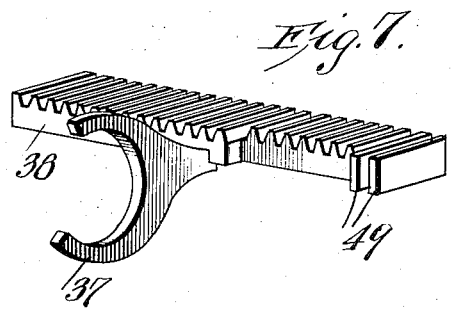
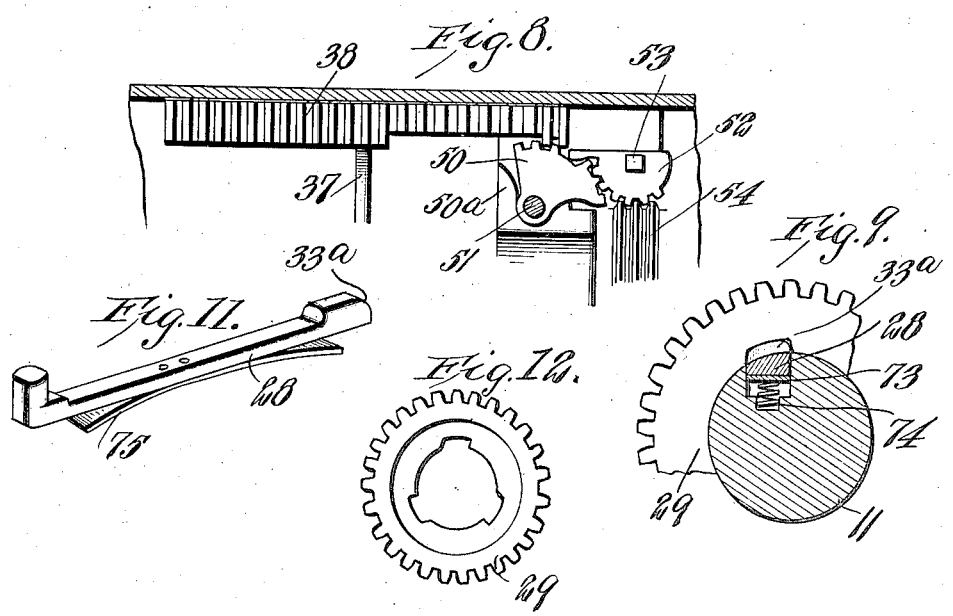
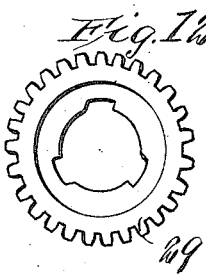
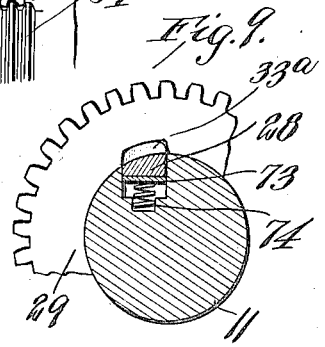
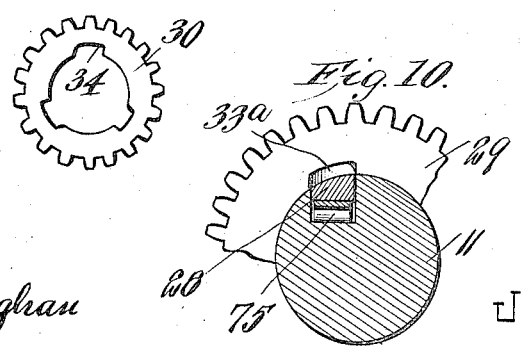
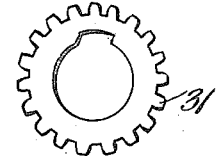

UNITED STATES PATENT OFFICE.

JOSEPH KENNARD KOONS, OF MONTGOMERY, PENNSYLVANIA.

TRANSMISSION-GEARING.

958,256.   Specification of Letters Patent.   Patented May 17, 1910.

Application filed January 9, 1909. Serial No. 471,433.

*To all whom it may concern:*

Be it known that I, JOSEPH K. KOONS, a citizen of the United States, and a resident of Montgomery, in the county of Lycoming and State of Pennsylvania, have invented certain new and useful Improvements in Transmission-Gearing, of which the following is a specification.

My invention is an improvement in transmission gearing, and consists in certain novel constructions and combinations of parts hereinafter described and claimed.

Figure 3:
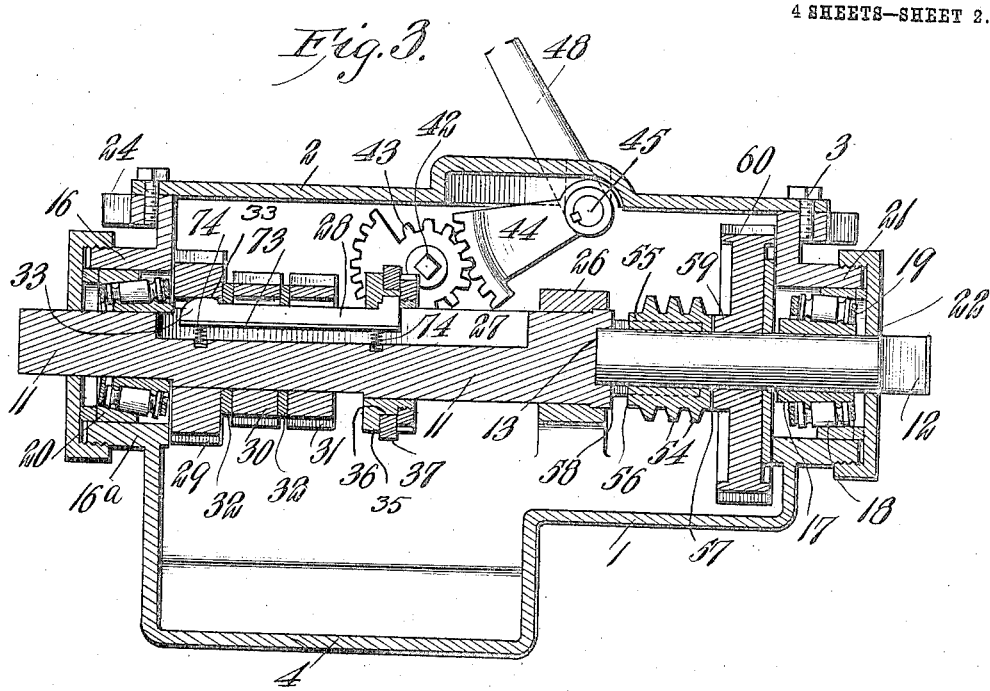
Figure 5:
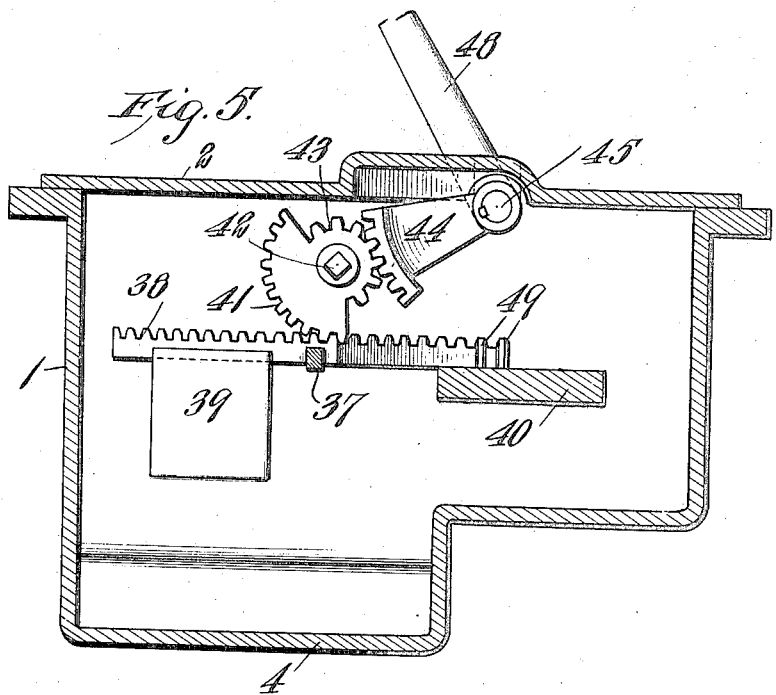

Referring to the drawings forming a part hereof—Figure 1 is a plan view of the gearing with the cover of the casing removed; Fig. 2 is a section on the line 2—2 of Fig. 1, looking in the direction of the arrow; Fig. 3 is a section on the line 3—3 of Fig. 1; Fig. 4 is a section on the line 4—4 of Fig. 1; Fig. 5 is a section on the line 5—5 of Fig. 1; Fig. 6 is a diagrammatic view of the gear connection; Fig. 7 is a perspective view of the rack bar; Fig. 8 is a plan view of the same; Fig. 9 is a section through the driven shaft; Fig. 10 is a similar view showing a modified form of spring; Fig. 11 is a perspective view of the key with the modified form of spring; and Figs. 12, 13 and 14 are side views of the gears.

The present embodiment of my invention comprises a gear casing 1 provided with a removable top 2, which is secured in place by set screws 3. Near one end the gear casing is provided with a depression 4, and within the depression is arranged a pair of spaced bearings 5, each of which is connected by lag screws 6 with an integral block 7 in the depression. A stub shaft 8 is journaled in the bearings, the shaft having secured thereto a pair of integral gear wheels 9 and 10, one of which 9, is of greater diameter than the other.

The transmission member consists of two sections 11 and 12, the shaft 11 being connected with the motor, while the shaft 12 is connected with the mechanism to be driven. The shafts are arranged in alinement, and the shaft 11 is provided in its end with a longitudinal recess 13, in which is received the end of the shaft 12.

The ends of the gear casing are provided with notches, within which are removably mounted plates 14, having an integral lateral flange 15 abutting against the inner face of the casing, and each of said plates is provided with a hub section 16, coöperating with a hub section 16ª on the casing and within the hub is received a roller bearing to be presently described, the bearing in one plate receiving the section 11, and the bearing in the other receiving the section 12. Each of said bearings consists of a conical sleeve 17 secured to the shaft in any suitable manner, and whose outer face is engaged by an annular series of rollers 18 mounted in a roller casing 19, and the outer surface of the series is engaged by a ring 20 received in the hub, and whose inner surface is conical to correspond with the position of the rollers. The series of rollers are arranged in cone shape, as will be evident from an inspection of Fig. 3.

The outer ends of the hubs 16 are externally threaded as at 21, and a cap 22 is threaded on to each hub, the cap being provided with a central opening for receiving the shaft, and its outer peripheral edge is provided with a series of notches 23 arranged in spaced relation, which notches are adapted to be engaged by a lug 24 which is secured to the plate 14 by means of a set screw 25. The lug 24 locks the cap in its adjusted position.

The inner end of the shaft 11 of the transmission shaft rests in a bearing 26, and the said shaft within the casing is provided with a key-way 27, within which is movable a key 28, and the key is adapted to connect one of a series of gears to the shaft in a manner to be presently described. The gears 29, 30 and 31 are journaled loosely on the shaft, and they are separated and spaced apart from each other by rings 32.

The key 28 before mentioned is provided at one end with a projection 33 for engaging a key-way 34 in the gear, and the other end is connected with a collar 35 slidable on the shaft 11, the collar having a peripheral groove 36, in which is received the arms of a fork 37 integral with a rack bar 38 slidable in guideways 39 and 40 on the side of the casing.

The teeth of the rack bar 38 are in engagement with the teeth of a gear wheel, journaled as at 42, on the side of the casing, and provided with two gear segments 41 and 43 of unequal radius, the segment 41 engaging the teeth of the rack, while the segment 43 engages the teeth of another gear segment 44 secured to a rock shaft 45 journaled in a bearing 46 in the casing, and provided at its outer end with an operating lever 48.

It will be evident from the description, that when the lever 48 is rocked in one direction, the rack bar will be moved in the same direction, whereby to engage the projecting portion 33 of the key with one or the other of the gears 29, 30 and 31.

The end of the rack bar toward the driven mechanism is provided on its inner edge with a pair of teeth 49 which are adapted to engage with a gear segment 50 pivoted as at 51 in the casing, and the segment engages another segment 52 journaled as at 53 and whose teeth engage annular grooves 54 on a sleeve 55 movable longitudinally of the section 12. The free edges of the sleeve are provided with clutch teeth 56 and 57, the teeth 56 being adapted to engage with clutch teeth 58 on the adjacent end of the shaft 11, while the teeth 57 are adapted to engage with clutch teeth 59 on a gear wheel 60 journaled on the shaft 12.

It will be evident from the description, that only when the key 28 is in its innermost position, will the sleeve 55 be moved. It will be understood that the sleeve 55 is free to move longitudinally of the shaft 12, and is constrained to rotate therewith, so that when the teeth 56 are in engagement with the teeth 58 the shafts 11 and 12 are rotated together, while when the teeth 57 are in engagement with the teeth 59 the shaft 12, there will be no direct connection between the shafts.

A wide gear 61, is journaled on a pin 62 extending through a bearing 63 in the end of the casing, the pin being provided with an external head 64 which is secured to the casing by a set-screw 65. The gear 61 engages with an internal gear 66 on the rim 67 of a disk 68 integral with a counter-shaft 69 which is journaled in roller bearings 70 arranged within the gear casing, which bearings are similar to the roller bearings for the transmission shaft.

The opposite end of the counter-shaft has keyed thereto a gear 71, which is in mesh with the gear 60 on the shaft 11 of the transmission member. The gear 30 on the transmisison member meshes with a series of gear teeth 72 on the outer face of the rim 67, while the gear 31 meshes with the gear wheel 10, which is integral with the gear wheel 9, which meshes with the gear teeth 72.

The forward high speed drive is from the shaft 11 to the shaft 12, while the forward low speed drive is from the shaft 11 through the gears 30 and 72 to the counter-shaft and through the gears 71 and 60 to the shaft 12. The reverse drive is from the gear 31 through the gears 9, 10 and 72 to the counter-shaft, and from the counter-shaft through the gears 71 and 60 to the shaft 12.

The intermediate drive is from the shaft 11 of the transmission member through the gear wheel 29 to the wide gear wheel 61, which drives the disk 68 and the counter-shaft 69, and the movement of the counter-shaft is transmitted through the gear 71 and 60 to the driven mechanism.

It will be observed that the pair of teeth 49 on the rack bar do not engage the teeth of the segment 50 until the rack bar is entering its extreme forward position at which time, the key is passing through the gear 29 and engaging the sleeve 17. The beveled end 33ª of the projection 33 now engages the edge of the sleeve 17, thus depressing the key and releasing the portion 33 from the keyway of the gear wheel. As this releasing movement takes place, the teeth 58 of the shaft 11 engage the teeth 56 of the sleeve 55, and the shafts 11 and 12 rotate together as one.

It will be observed from an inspection of Figs. 9, 10 and 11, that the key 28 is beveled upon one side and does not move radially toward the shaft, the keyway being arranged to one side of the vertical center as shown in Figs. 9, and 10, whereby to permit the key to act somewhat in the manner of a pawl, the free reverse movement of the shaft being permitted by this arrangement.

The key may be slidable on a plate 73 supported by coil springs 74 or the said key may have an arched plate spring 75 secured to the bottom thereof as shown in Fig. 11. The gear wheels 29 and 30 are provided with three notches or keyways arranged at angles of 120° from each other, while the gear wheel 31 is provided with but one.

The rings 32 arranged between the gear wheels 29, 30 and 31, positively disengage the key from the one gear before it again engages with the next, since the said rings fit closely upon the shaft 11 of the transmission member, as will be evident from an inspection of Fig. 3. The gear segment 50 is limited in its movement by means of stops 50ª on each side thereof, and when the improved gearing is in use, the casing is filled with oil or grease so that all of the mechanism is lubricated thereby.

It will be evident from the description, that when the lever 48 is moved forwardly the low speed gear 30 will be first connected with the transmission member, a further forward movement will connect the gear 29 giving the intermediate speed giving a complete forward movement with the high speed or direct drive. A reverse movement of the lever from its first position will connect the gear 31 thus reversing the driving mechanism.

I claim:

1. In a device of the class described, a transmission member consisting of alined shafts, one of which is provided with a keyway and with a series of clutch teeth, a gear wheel loosely mounted on the other shaft and provided with clutch teeth, a plurality of gear wheels journaled loosely on the shaft provided with a keyway, a key movable in the keyway for connecting either of said gears to the shaft, a sleeve slidable on the other shaft, and provided with a series of clutch teeth at each end, one of the series coöperating with the teeth of the gear wheel and the other with the teeth on the first shaft whereby to couple said shafts together, a counter-shaft, a disk secured thereto provided with a flange having an external series of teeth meshing with one of the gear wheels on the first named shaft, and an internal series, a second gear wheel secured thereto and meshing with the gear wheel on the other shaft, a stub shaft, a pinion on the stub shaft meshing with another of the gear wheels on the first named shaft and with the internal series of gear teeth, means for moving the key whereby to connect either of the gear wheels on the first named shaft therewith, and means which upon the completion of the movement of the key in one direction will move the clutch to directly connect the shafts, and at the beginning of movement of the key in the other direction will disconnect said shafts and connect the gear wheel on the second shaft therewith, and means for positively disconnecting the key from one gear wheel before connecting with another.

2. In a device of the class described, a transmission member consisting of alined shafts, one of which is provided with a keyway and a series of clutch teeth, a gear wheel loosely mounted on the other shaft and provided with clutch teeth, a plurality of gear wheels journaled loosely on the shaft provided with a keyway, a key movable in the keyway for connecting either of said gears to the shaft, a sleeve slidable on the other shaft, and provided with a series of clutch teeth at each end, one of the series coöperating with the teeth of the gear wheel, and the other with the teeth on the first shaft whereby to couple said shafts together, a countershaft, a disk secured thereto provided with a flange having an external series of teeth meshing with one of the gear wheels on the first named shaft and an internal series of teeth, a second gear wheel secured thereto and meshing with the gear wheel on the other shaft, a stub shaft, a pinion on the stub shaft meshing with another of the gear wheels on the first named shaft and with the internal series of teeth, means for moving the key whereby to connect either of the gear wheels on the first named shaft therewith, and means which upon the completion of the movement of the key in one direction will move the clutch to directly connect the shafts, and at the beginning of movement of the key in the other direction will disconnect the shafts and connect the gear wheel on the second shaft therewith.

3. In a device of the class described, a transmission member consisting of alined shafts, a gear wheel loosely journaled on one of the shafts of the transmission shaft, a sleeve slidable on the said shaft, means whereby when said sleeve is moved in one direction it will couple the gear with the shaft, and when moved in the other direction will connect said shaft with the other shaft, a countershaft, a gear wheel on the countershaft meshing with the gear wheel on the first named shaft, a plurality of gear wheels loosely journaled on the other shaft, gear wheels on the counter-shaft with which sundry of said gear wheels mesh, an idler arranged between one of the gears on the transmission shaft and one of the gears on the counter-shaft, said other shaft being provided with a keyway, a key movable through the keyway and provided at one end with a projection for engaging the gear wheel whereby to connect said wheels with the shaft, means for moving said key, rings arranged between the gear wheels and closely encircling the said shaft whereby to positively disengage the key from one gear before it engages the succeeding gear, and means in connection with the key moving means for moving the sleeve, at the completion of the movement of said key in one direction and at the beginning of movement of said key in the other direction.

4. The combination of a driving shaft, a driven shaft capable of being operated independently of the drive shaft, a gear on the driven shaft, a series of gears loose on the driving shaft, gearing between the said loose gears and the gear on the driven shaft, a key in the driving shaft and having an outwardly projecting portion to engage with any selected loose gear, said key being movable longitudinally of said shaft into position to engage with a selected loose gear and the key being movable radially for the adjustment of its projection into and out of connection with said selected gear, a clutch sleeve keyed on the driven shaft and movable into and out of engagement with the gear on said shaft, and means for simultaneously shifting said key in the driving shaft and the clutch sleeve on the driven shaft substantially as set forth.

5. The combination of a driving shaft, a driven shaft, a series of loose gears on the driving shaft, intermediate gearing between said loose gears and the driven shaft, a clutch for coupling the driving shaft and the driven shaft directly together, means for keying any selected one of the loose gears to the driving shaft, a rack bar for shifting said key into position to engage with any selected loose gear, and gearing between said rack bar and the means for coupling the drive shaft and driven shaft for operating said means, substantially as set forth.

6. The combination of a driving shaft, a driven shaft, a gear on the driven shaft, a clutch on the driven shaft for keying said gear thereto, the said clutch being movable in one direction into engagement with the gear and in the opposite direction to couple the driven shaft directly with the driving shaft, means for keying said loose gears successively to the driving shaft and for ultimately freeing all of said gears, and an operating means for shifting said keying means throughout the series of loose gears to its ultimate neutral position and for simultaneously shifting the clutch from engagement with the gear on the driven shaft into engagement with the driving shaft when the keying means reaches its ultimate neutral position, substantially as set forth.

7. In a device of the class described, a shaft provided with a keyway, gears journaled on the shaft, and having keyways for registering with the keyway of the shaft, and a key movable in the keyway, said key having one side beveled for the purpose set forth, and a spring acting to move the key radially into engagement with a selected gear.

8. In a device of the class described, a shaft provided with a keyway the planes of whose side walls are both on one side of the center of the shaft, gears journaled on the shaft and having keyways the planes of whose side walls are both on one side of the center of the gears for registering with the keyway of the shaft, a key movable in the keyway, said key having one side beveled, and a spring acting to move the key radially into engagement with a selected gear.

9. In a device of the class described, a shaft provided with a keyway the planes of whose side walls are both on one side of the center of the shaft, gears journaled on the shaft and having keyways for registering with the keyway of the shaft, a key movable in the keyway, said key having one side beveled, and a spring supporting the key for moving the same radially into engagement with a selected gear.

10. In a device of the class described, a shaft provided with a keyway, gears journaled on the shaft and having keyways for registering with the keyway of the shaft, the planes of the side walls of the keyways of the gears being both on one side of the center thereof, a key having one side beveled movable in the keyway, and a spring acting to move the key radially into engagement with a selected gear.

11. In a device of the class described, a shaft provided with a keyway, the planes of whose side walls are both on one side of the center of the shaft, gears journaled on the shaft and having keyways for registering with the keyway of the shaft, a key movable in the keyway and a spring acting to move the key radially into engagement with a selected gear.

12. In a device of the class described, a shaft provided with a keyway, gears journaled on the shaft, and having keyways registering with the keyway of the shaft, the planes of the side walls of the keyways of the gears being on one side of the center thereof, a key movable in the keyway, and a spring acting to move the key radially into engagement with a selected gear.

13. In a device of the class described, a shaft provided with a keyway, gears journaled on the shaft, and having keyways for registering with the keyway thereof, the planes of the side walls of the keyways of the shaft and the gears both being upon one side of the common center of the shaft and the gears, a key movable in the keyway of the shaft, and a spring acting to move it radially into engagement with a selected gear.

14. In a device of the class described, a transmission shaft, a plurality of gears journaled loosely thereon, means for keying said loose gears successively to the driving shaft and for ultimately freeing all of said gears, a driven shaft, a gear loosely mounted thereon, means for keying the gear to the driven shaft, the said means being movable in one direction for connecting the gear therewith and in the opposite direction for directly connecting the transmission shaft to the driven shaft, and operating means for shifting the first named keying means throughout the series of loose gears to its ultimate neutral position, and for simultaneously operating said last named keying means.

JOSEPH KENNARD KOONS.

Witnesses:
P. F. HARTRANFT,
LA MONT R. RENTZ.